(12) United States Patent
Prokofieva et al.

(10) Patent No.: US 10,901,500 B2
(45) Date of Patent: *Jan. 26, 2021

(54) EYE GAZE FOR SPOKEN LANGUAGE UNDERSTANDING IN MULTI-MODAL CONVERSATIONAL INTERACTIONS

(71) Applicant: Microsoft Technology Licensing, LLC, Redmond, WA (US)

(72) Inventors: Anna Prokofieva, Vancouver (CA); Fethiye Asli Celikyilmaz, Kirkland, WA (US); Dilek Z Hakkani-Tur, Kirkland, WA (US); Larry Heck, Los Altos, CA (US); Malcolm Slaney, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,414

(22) Filed: Apr. 30, 2019

(65) Prior Publication Data

US 2019/0391640 A1 Dec. 26, 2019

Related U.S. Application Data

(63) Continuation of application No. 14/496,538, filed on Sep. 25, 2014, now Pat. No. 10,317,992.

(51) Int. Cl.
*G06F 3/01* (2006.01)
*G02B 27/00* (2006.01)
(Continued)

(52) U.S. Cl.
CPC .......... *G06F 3/013* (2013.01); *G02B 27/0093* (2013.01); *G06F 3/012* (2013.01);
(Continued)

(58) Field of Classification Search
CPC ......... G02B 27/0093; G06F 2203/0381; G06F 3/012; G06F 3/013; G06F 3/167;
(Continued)

(56) References Cited

U.S. PATENT DOCUMENTS 6,246,779 B1 * 6/2001 Fukui .................. G06K 9/00268
382/100
8,487,959 B1 * 7/2013 Khan ........................ G06F 3/013
345/619
(Continued)

FOREIGN PATENT DOCUMENTS

| CN | 102541438 A | 7/2012 |
| CN | 102567718 A | 7/2012 |
| CN | 103605208 A | 2/2014 |

OTHER PUBLICATIONS

"Summons to Attend Oral Proceedings issued in European Patent Application No. 15778481.0", dated May 20, 2019, 9 Pages.
(Continued)

*Primary Examiner* — Afroza Chowdhury
(74) *Attorney, Agent, or Firm* — Schwegman Lundberg & Woessner, P.A.

(57) ABSTRACT

Improving accuracy in understanding and/or resolving references to visual elements in a visual context associated with a computerized conversational system is described. Techniques described herein leverage gaze input with gestures and/or speech input to improve spoken language understanding in computerized conversational systems. Leveraging gaze input and speech input improves spoken language understanding in conversational systems by improving the accuracy by which the system can resolve references—or interpret a user's intent—with respect to visual elements in a visual context. In at least one example, the techniques herein describe tracking gaze to generate gaze input, recognizing speech input, and extracting gaze features and lexical (Continued)

features from the user input. Based at least in part on the gaze features and lexical features, user utterances directed to visual elements in a visual context can be resolved.

20 Claims, 6 Drawing Sheets (51) Int. Cl.
  *G10L 17/22*   (2013.01)
  *G10L 15/08*   (2006.01)
  *G10L 15/00*   (2013.01)
  *G06F 3/16*   (2006.01)
  *G06K 9/00*   (2006.01)

(52) U.S. Cl.
  CPC ......... *G06F 3/167* (2013.01); *G06K 9/00597* (2013.01); *G10L 15/00* (2013.01); *G10L 15/08* (2013.01); *G10L 17/22* (2013.01); *G06F 2203/0381* (2013.01); *G06K 9/00302* (2013.01); *G06K 9/00335* (2013.01)

(58) Field of Classification Search
  CPC ........... G06K 9/00302; G06K 9/00335; G06K 9/00597; G10L 15/00; G10L 15/08; G10L 17/22
  See application file for complete search history.

(56) References Cited

U.S. PATENT DOCUMENTS

| | | | |
|---|---|---|---|
| 10,317,992 B2 * | 6/2019 | Prokofieva | G06F 3/012 |
| 2008/0178126 A1 | 7/2008 | Beeck et al. | |
| 2010/0033333 A1 * | 2/2010 | Victor | A61B 3/113 340/576 |
| 2012/0253823 A1 * | 10/2012 | Schalk | G01C 21/3608 704/270.1 |
| 2013/0030811 A1 * | 1/2013 | Olleon | B60K 37/06 704/267 |
| 2013/0304479 A1 * | 11/2013 | Teller | G06F 3/013 704/275 |
| 2013/0307771 A1 * | 11/2013 | Parker | G06F 3/013 345/158 |
| 2013/0346085 A1 * | 12/2013 | Stekkelpak | G10L 15/22 704/275 |
| 2014/0099623 A1 * | 4/2014 | Amit | G09B 7/00 434/350 |
| 2014/0184550 A1 * | 7/2014 | Hennessey | G06F 3/013 345/173 |
| 2014/0337740 A1 * | 11/2014 | Kwon | G06F 3/04817 715/728 |
| 2016/0091967 A1 * | 3/2016 | Prokofieva | G06F 3/012 345/156 |

OTHER PUBLICATIONS

"First Office Action Issued in Chinese Patent Application No. 201580050763.X", dated Jul. 31, 2019, 11 Pages.
"Second Office Action Issued in Chinese Patent Application No. 201580050763.X", dated Jan. 20, 2020, 7 Pages.
"First Office Action Issued in Indian Patent Application No. 201747009461", dated Sep. 16, 2020, 7 Pages.
U.S. Appl. No. 14/496,538, filed Sep. 25, 2014, Eye Gaze for Spoken Language Understanding in Multi-Modal Conversational Interactions, now U.S. Pat. No. 10,317,992.

\* cited by examiner

EYE GAZE FOR SPOKEN LANGUAGE UNDERSTANDING IN MULTI-MODAL CONVERSATIONAL INTERACTIONS

CROSS-REFERENCE TO RELATED APPLICATION

This application is a continuation of U.S. patent application Ser. No. 14/496,538, titled "Eye Gaze for Spoken Language Understanding in Multi-Modal Conversational Interactions" and filed Sep. 25, 2014, the disclosure of which is hereby incorporated by reference in its entirety.

BACKGROUND

When humans converse with each other, they naturally combine information from different modalities such as speech, gestures, facial/head pose and expressions, etc. With the proliferation of computerized devices, humans have more opportunities to interact with displays associated with the computerized devices. Spoken dialog systems, or conversational systems, enable human users to communicate with computing systems by various modes of communication, such as speech and/or gesture. Current conversational systems identify intent of a user interacting with a conversational system based on the various modes of communication. In some examples, conversational systems resolve referring expressions in user utterances by computing a similarity between a user's utterance and lexical descriptions of items and associated text on a screen. In other examples, on-screen object identification is necessary to understand a user's intent because the user's utterance is unclear with respect to which on-screen object the user can be referring. Accordingly, current techniques leverage multi-modal inputs, such as speech and gesture, to determine which objects a user refers to on a screen.

SUMMARY

Techniques for understanding and resolving references to visual elements in a visual context associated with conversational computing systems are described herein. The techniques herein describe detecting gaze, recognizing speech, and interpreting a user's intent with respect to visual elements in a visual context based at least in part on eye gaze features and lexical features extracted from user input (e.g., gaze, speech, etc.).

In at least one example, the techniques described herein include identifying visual elements that are available for user interaction in a visual context, such as a web browser, application interface, or some other conversational system. Additionally, the techniques described herein include receiving user input associated with one or more of the visual elements in the visual context. In at least one example, the user input can include a user utterance derived from speech input and referring to intended particular visual element and user gaze input associated with at least some of the visual elements. The techniques described herein further include extracting lexical features based at least in part on the user utterances and visual elements and gaze features based at least in part on the user gaze input and the visual elements. Moreover, the techniques described herein include determining the particular visual element of the one or more visual elements associated with the user input based at least in part on the lexical features and gaze features. In some examples, determining the particular visual element may also be based at least in part on heat map features.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

DESCRIPTION OF FIGURES

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Techniques for improving accuracy in understanding and resolving references to visual elements in visual contexts associated with conversational computing systems are described herein. With the increased availability and use of computing systems that present information on a display, users increasingly seek opportunities to speak to the systems, referring to visual elements on the display, to perform tasks associated with the visual elements. Tracking user gaze and leveraging gaze input based on the user gaze with gestures and/or speech input can improve spoken language understanding in conversational systems by improving the accuracy by which the system can understand and resolve references to visual elements in a visual context.

The techniques described herein combine gaze input with speech input to more accurately identify visual elements that a user refers to on a display or as presented in another visual context. In at least one example, the techniques described herein detect gaze, recognize speech, and interpret a user's intent with respect to visual elements in the visual context based at least in part on features associated with the gaze and/or speech input. The multi-modal communication supplementing speech input with gaze input reduces the error rate in identifying visual elements that are intended targets of a user utterance. That is, knowing what a user is looking at and/or focused on can improve spoken language understanding by improving the accuracy in which referring expressions in user utterances can be resolved. Combining speech and gaze input can streamline processes for ascertaining what a user means and/or is referring to when the user is interacting with conversational computing systems.
Illustrative Environment The environments described below constitute but one example and are not intended to limit application of the system described below to any one particular operating environment. Other environments can be used without departing from the spirit and scope of the claimed subject matter. The various types of processing described herein can be implemented in any number of environments including, but not limited to, stand-alone computing systems, network environments (e.g., local area networks or wide area networks), peer-to-peer network environments, distributed-computing (e.g., cloud-computing) environments, etc.

Figure 1:
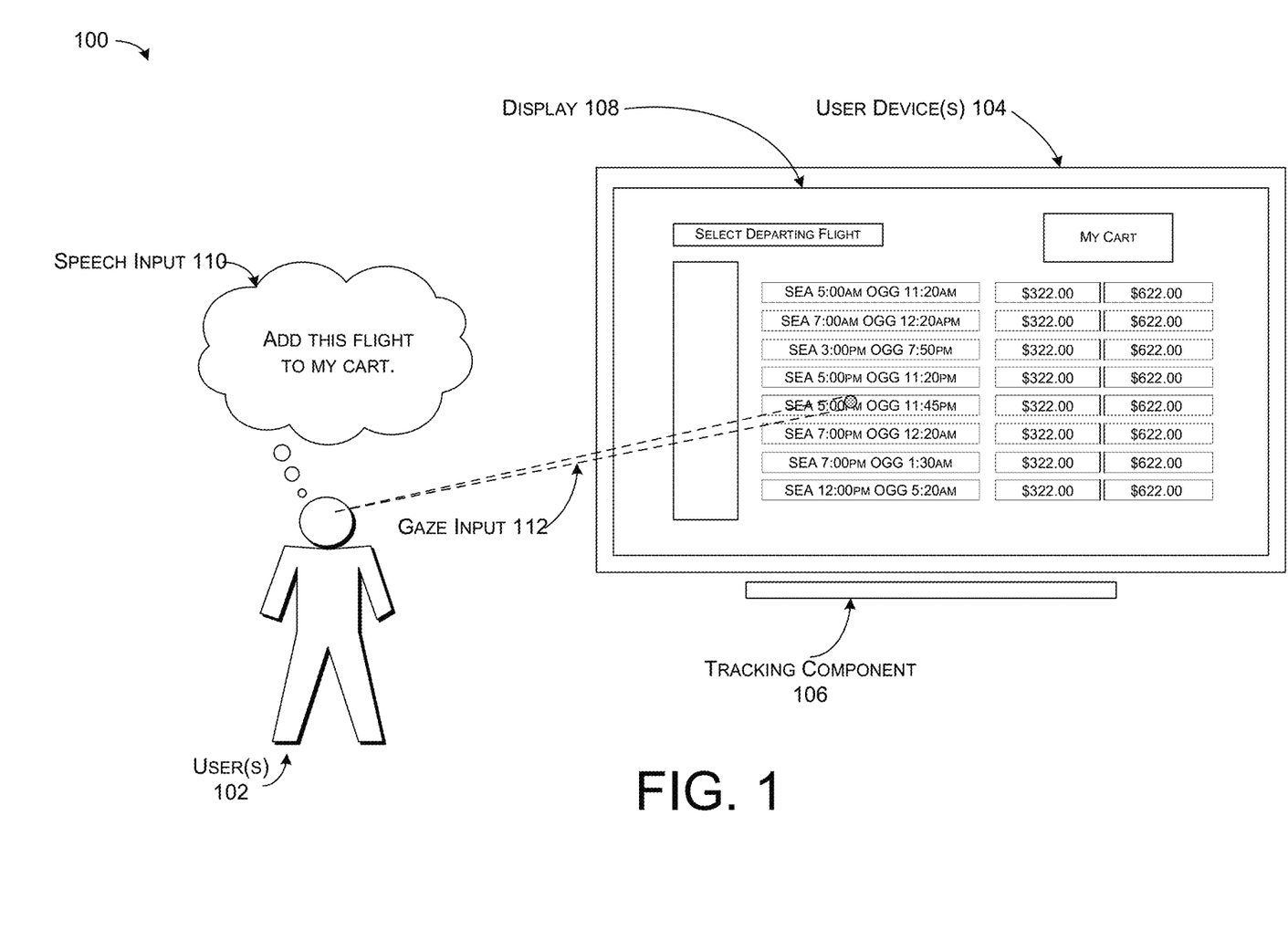
FIG. 1 illustrates an example environment for resolving references to visual elements in a visual context associated with a computerized conversational system.

FIG. 1 illustrates an example environment 100 for resolving references to visual elements in a visual context. Environment 100 includes one or more user(s) 102 that interact with a visual context via one or more user device(s) 104. The visual context can include any environment that presents information to a user and is configured to receive user input directed to actions and/or choices based on what the user sees in the presented information. The visual context can include a web browser, a conversational interaction system, a human robot and/or other human/machine interaction system, etc. In at least one example, a web browser can be a free-form web browser, such as a web browser that enables a user to browse any web page (e.g., Internet Explorer®, Chrome®, Safari®, etc.). A conversational interaction system can be an application that can present visual elements representing movies, restaurants, times, etc., to a user 102 via a user interface.

The one or more user device(s) 104 can comprise, for example, a desktop computer, laptop computer, smartphone, videogame console, television, or any of the user device(s) 104 described below with respect to FIG. 2. The one or more user device(s) 104 can be in communication with a tracking component 106 and, in at least some examples, a display 108. In at least one example, the tracking component 106 and/or display 108 can be integrated into the one or more user device(s) 104. In other examples, the tracking component 106 and/or display 108 can be separate devices connected to the one or more user device(s) 104. In FIG. 1, the display 108 is integrated into a user device 104 and the tracking component 106 is independent of the user device 104. Tracking component 106 can comprise any sensor, camera, device, system, etc. that can be used for tracking eye gaze, head pose, body movement, etc. For instance, tracking component 106 can comprise Tobii Rex eye tracking systems, Sentry eye tracking systems, Microsoft Kinect® technology, etc.

In at least one example, the display 108 can represent a user interface and the user interface can present one or more visual elements to a user 102 in a visual context such as a web browser or conversational interaction system, as described above. The visual elements can include text, objects, and/or items associated with tasks and/or actions such as browsing, searching, filtering, etc., which can be performed by the conversational computing system. The visual elements can be presented to a user 102 via the display 108 for receiving user interaction directing the conversational computing system to perform the tasks and/or actions associated with the visual elements. In some examples, the visual context can include a web browser comprising various forms of hyperlinks, buttons, text boxes, etc. The hyperlinks, buttons, text boxes, etc., each can represent a different visual element. In other examples, the visual context can include a conversational interaction system, such as an application interface, and can present a set of items, such as movies, books, images, restaurants, etc., that are stored in the system. The text and/or images representative of the movies, books, images, restaurants, etc., each can represent a different visual element. In other examples, the visual context can include a human robot and/or other human/machine interaction system. In such examples, a display 108 cannot be included as part of the system and visual elements can include physical books, videos, images, etc. The visual elements can be dynamic and/or situational and can change depending on the visual context and user 102 interactions with the visual elements.

As described above, the one or more user device(s) 104 can be associated with a visual context of a computerized conversational system. The one or more user(s) 102 can interact with the visual context via various modes of communication, such as gaze, speech, gestures, speech prosody, facial expressions, etc. User input can include one or more of speech input 110, gaze input 112, gesture input, etc. In some examples, at least two user(s) 102 can interact with the visual context. Microphones and components that can be associated with the one or more user device(s) 104 for detecting and/or receiving speech input 110 can detect differences in user speech input 110 spoken by a first user and speech input 110 spoken by a second user. Detecting differences between speech inputs 110 can enable the one or more user device(s) to match a first user's gaze input 112 to the first user's speech input 110 and to differentiate the first user's inputs from a second user's gaze input 112 and a second user's speech input 110.

User utterances can include input transcribed from speech input 110. In some examples, a user utterance can include a reference to one or more visual elements in the visual context. The one or more visual elements referred to in a user utterance can represent visual elements that the user 102 intends to interact with or direct to perform a corresponding action or task. The user 102 can interact with the visual context without constraints on vocabulary, grammar, and/or choice of intent that can make up the user utterance. In some examples, user utterances can include errors based on transcription errors and/or particular speech patterns that can cause an error.

User utterances can include commands to direct the conversational system to perform tasks associated with visual elements presented in the visual context. The user utterances can include commands for executing a user action or user choice such as requests to scroll, follow links on a display, fill in blanks in a form, etc. In some examples, a reference can include a generic request, independent of any visual elements presented to the user in the visual context. For instance, a user 102 can ask the computerized conversational system to "show me movies nearby" or "take me to the shoes." In other examples, a reference can include a command that refers to a visual element presented to the user 102 in the visual context. For instance, a user 102 can be viewing multiple departing flight options for flying from Seattle, Wash. (SEA) to Maui, Hi. (OGG), and can identify a flight to purchase. The user 102 can speak the words "add this flight to my cart," as shown in the speech input 110 in FIG. 1. A user utterance can be transcribed from the speech input 110 as described above.

The user utterance "add this flight to my cart," can be ambiguous such that the computerized conversational system may not know which flight of the multiple flights presented to the user 102 the user 102 is referring to. The computerized conversational system can more easily identify the flight referred to in the user utterance by considering what flight the user 102 is looking at before, during, or shortly after the user 102 makes the user utterance.

In at least one example, a user utterance can include an error as described above. In some examples, the user utterance can include an erroneous transcription from speech input 110. The user 102 may have spoken the words, "add this flight to my cart," and the transcribed user utterance may include the words, "add this fight to my cart." In other examples, the user utterance can reflect a particular speech pattern that causes a transcription error. The user 102 may have difficulties pronouncing the word "orange" and may desire to purchase a flight to Orange County, Calif. The user 102 may desire to speak the words, "add the flight to Orange County to my cart," but because the user 102 mispronounces "orange" as "onge" the user utterance can include an error. However, in both examples of a transcription error or speech pattern that causes a transcription error, the computerized conversational system can leverage gaze input 112 to resolve the user utterance laden with error. That is, by ascertaining which flight a user 102 looks at and/or fixes his or her gaze on before, during, or shortly after the user makes the user utterance, the computerized conversational system can identify which flight the user 102 desires to purchase.

Gaze can represent a direction in which a user's eyes are facing during a speech input 110. The tracking component 106 can track user gaze to generate gaze input 112. Gaze input 112 can include eye gaze input, head pose input, and/or nose pointing input. Head pose input can include a configuration in which a user's head poses during a speech input 110. Nose pointing can include a direction a user's nose points during a speech input 110. Head pose input and nose pointing input can each serve as proxies for eye gaze input. The alternative and/or additional facial orientation characteristics (e.g., head pose and/or nose pointing) can be used depending on the range of the tracking component 106. In at least one example, the tracking component 106 can be within a predetermined distance from the user's 102 face and accordingly, the tracking component 106 can track user 102 eye gaze for the gaze input 112. In an alternative example, the tracking component can be beyond a predetermined distance from the user's 102 face and, as a result, the tracking component 106 can track head pose or nose pointing as a proxy for user 102 gaze.

The tracking component 106 can track movement of a user's 102 eyes to generate gaze input 112 for the user 102. Based at least in part on the user utterance derived from the speech input 110 and the gaze input 112, the computerized conversational system can identify which visual element the user 102 intended to interact with in the speech input 110. Leveraging the combination of speech input 110 and gaze input 112 can improve the accuracy in which computerized conversational systems can identify the intended visual element referred to in a speech input 110.

Figure 2:
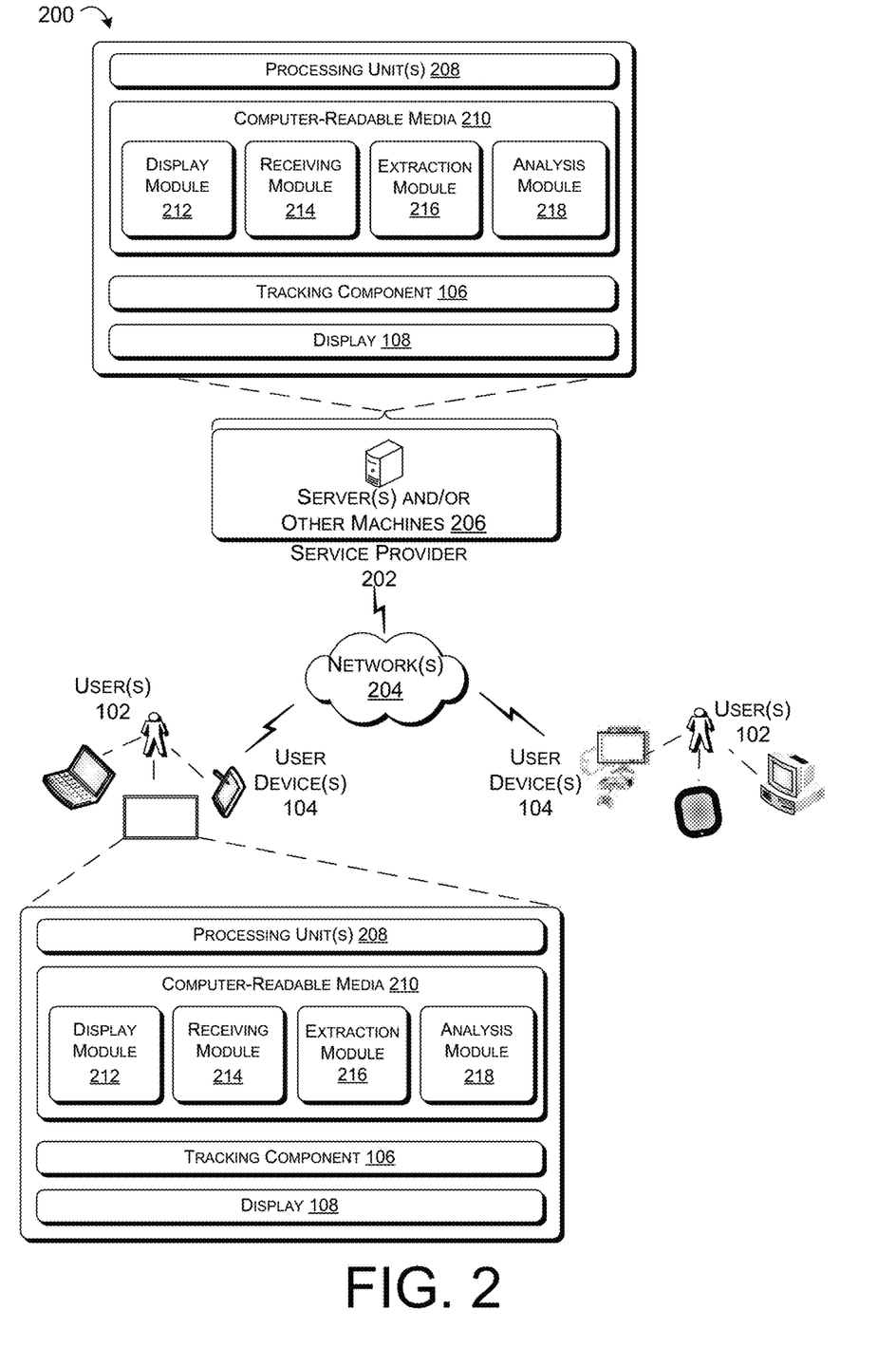
FIG. 2 illustrates an example operating environment that includes a variety of devices and components that can be implemented for resolving references to visual elements in a visual context associated with a computerized conversational system.

FIG. 2 illustrates an example operating environment 200 that includes a variety of devices and components that can be implemented for resolving references to visual elements in a visual context. In at least one example, the techniques described herein can be performed remotely (e.g., by a server, cloud, etc.). In some examples, the techniques described herein can be performed locally on a computing device, as described below. More particularly, the example operating environment 200 can include a service provider 202, one or more network(s) 204, one or more user(s) 102, and one or more user device(s) 104 associated with the one or more users 102, as described in FIG. 1.

As shown, the service provider 202 can include one or more server(s) and other machines 206 and/or the one or more user device(s) 104, any of which can include one or more processing unit(s) 208 and computer-readable media 210. In various examples, the service provider 202 can reduce the error rate in resolving references to visual elements in a visual context associated with a computerized conversational system.

In some examples, the network(s) 204 can be any type of network known in the art, such as the Internet. Moreover, the one or more user device(s) 104 can communicatively couple to the network(s) 204 in any manner, such as by a global or local wired or wireless connection (e.g., local area network (LAN), intranet, etc.). The network(s) 204 can facilitate communication between the server(s) and other machines 206 and/or the one or more user device(s) 104 associated with the one or more user(s) 102.

In some examples, the one or more user(s) 102 can interact with the corresponding user device(s) 104 to perform various functions associated with the one or more user device(s) 104, which can include one or more processing unit(s) 208, computer-readable media 210, tracking component 106, and display 108.

The one or more user device(s) 104 can represent a diverse variety of device types and are not limited to any particular type of device. Examples of user device(s) 104 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

The service provider 202 can be any entity, server(s), platform, etc., that can leverage a collection of features from communication platforms, including online communication platforms. Moreover, and as shown, the service provider 202 can include one or more server(s) and/or other machines 206, which can include one or more processing unit(s) 208 and computer-readable media 210 such as memory. The one or more server(s) and/or other machines 206 can include devices, as described below.

Examples support scenarios where device(s) that can be included in the one or more server(s) and/or other machines 206 can include one or more computing devices that operate in a cluster or other grouped configuration to share resources, balance load, increase performance, provide failover support or redundancy, or for other purposes. Device(s) included in the one or more server(s) and/or other machines 206 can belong to a variety of categories or classes of devices such as traditional server-type devices, desktop computer-type devices, mobile devices, special purpose-type devices, embedded-type devices, and/or wearable-type devices. Thus, although illustrated as desktop computers, device(s) can include a diverse variety of device types and are not limited to a particular type of device. Device(s) included in the one or more server(s) and/or other machines 206 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) that can be included in the one or more server(s) and/or other machines 206 can include any type of computing device having one or more processing unit(s) 208 operably connected to computer-readable media 210 such as via a bus, which in some instances can include one or more of a system bus, a data bus, an address bus, a PCI bus, a Mini-PCI bus, and any variety of local, peripheral, and/or independent buses. Executable instructions stored on computer-readable media 210 can include, for example, display module 212, receiving module 214, extraction module 216, analysis module 218, and other modules, programs, or applications that are loadable and executable by processing units(s) 208. Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device(s) that can be included in the one or more server(s) and/or other machines 206 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, eye and/or body tracking device and the like) and/or output peripheral devices (e.g., a display, a printer, audio speakers, a haptic output, and the like). The one or more input/output (I/O) interface(s) can allow user device(s) 104 to communicate with the tracking component 106 and/or the display 108. Devices that can be included in the one or more server(s) and/or other machines 206 can also include one or more network interfaces coupled to the bus to enable communications between computing device and other networked devices such as the one or more user device(s) 104. Such network interface(s) can include one or more network interface controllers (NICs) or other types of transceiver devices to send and receive communications over a network. For simplicity, some components are omitted from the illustrated device.

User device(s) 104 can further include one or more input/output (I/O) interface(s) coupled to the bus to allow user device(s) 104 to communicate with other devices such as user input peripheral devices (e.g., a keyboard, a mouse, a pen, a game controller, a voice input device, a touch input device, gestural input device, eye and/or body tracking device and the like) and/or output peripheral devices (e.g., a display, a printer, audio speakers, a haptic output, and the like). The one or more input/output (I/O) interface(s) can allow user device(s) 104 to communicate with the tracking component 106 and/or the display 108.

Processing unit(s) 208 and can represent, for example, a central processing unit (CPU)-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) 208 can execute one or more modules and/or processes to cause the one or more user device(s) 104 to perform a variety of functions, as set forth above and explained in further detail in the following disclosure. Additionally, each of the processing unit(s) 208 can possess its own local memory, which also can store program modules, program data, and/or one or more operating systems.

In at least one example, the computer-readable media 210 in the one or more user device(s) 104 can include components that facilitate interaction between user device(s) 104 and the user(s) 102. For instance, the computer-readable media 210 can include at least a display module 212, receiving module 214, extraction module 216, and analysis module 218 that can be implemented as computer-readable instructions, various data structures, and so forth via at least one processing unit(s) 208 to configure a device to reduce the error rate in resolving references to visual elements in a visual context associated with a computerized conversational system.

In at least one example, the display module 212 can be configured to communicate with display 108 and cause visual elements (e.g., text, objects, items, etc.) to be presented on the display 108. As described above, the display 108 can represent a user interface and the display module 212 can communicate with the display to present one or more visual elements to a user 102 in a user interface associated with a web browser or conversational interaction system. The visual elements can include text, objects and/or items associated with tasks and/or actions such as browsing, searching, filtering, etc., which can be performed by the conversational computing system. The display module 212 can present the visual elements to a user 102 via the display 108 for receiving user interaction directing the conversational computing system to perform the tasks and/or actions associated with the visual elements, as described above.

In at least one example, the receiving module 214 can be configured to receive input from the one or more user(s) 102 such as speech input 110, gestures, gaze input 112, body positioning, etc., as described below. The receiving module 214 can also be configured to transcribe speech input 110 into user utterances for processing by the extraction module 216. The extraction module 216 can be configured to extract features based at least in part on the user inputs and visual elements in the visual context. For instance, the extraction module 216 can extract lexical similarity features, phonetic match features, gaze features, and/or heat map features. Additional details regarding the extraction module 216 and the features are described below. The analysis module 218 can be configured to resolve references to visual elements in a visual context based at least in part on the extracted features, as described below.

Depending on the exact configuration and type of the user device(s) 104 and or servers and/or other machines 206, computer-readable media 210 can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. As defined herein, computer storage media does not include communication media.

Figure 3:
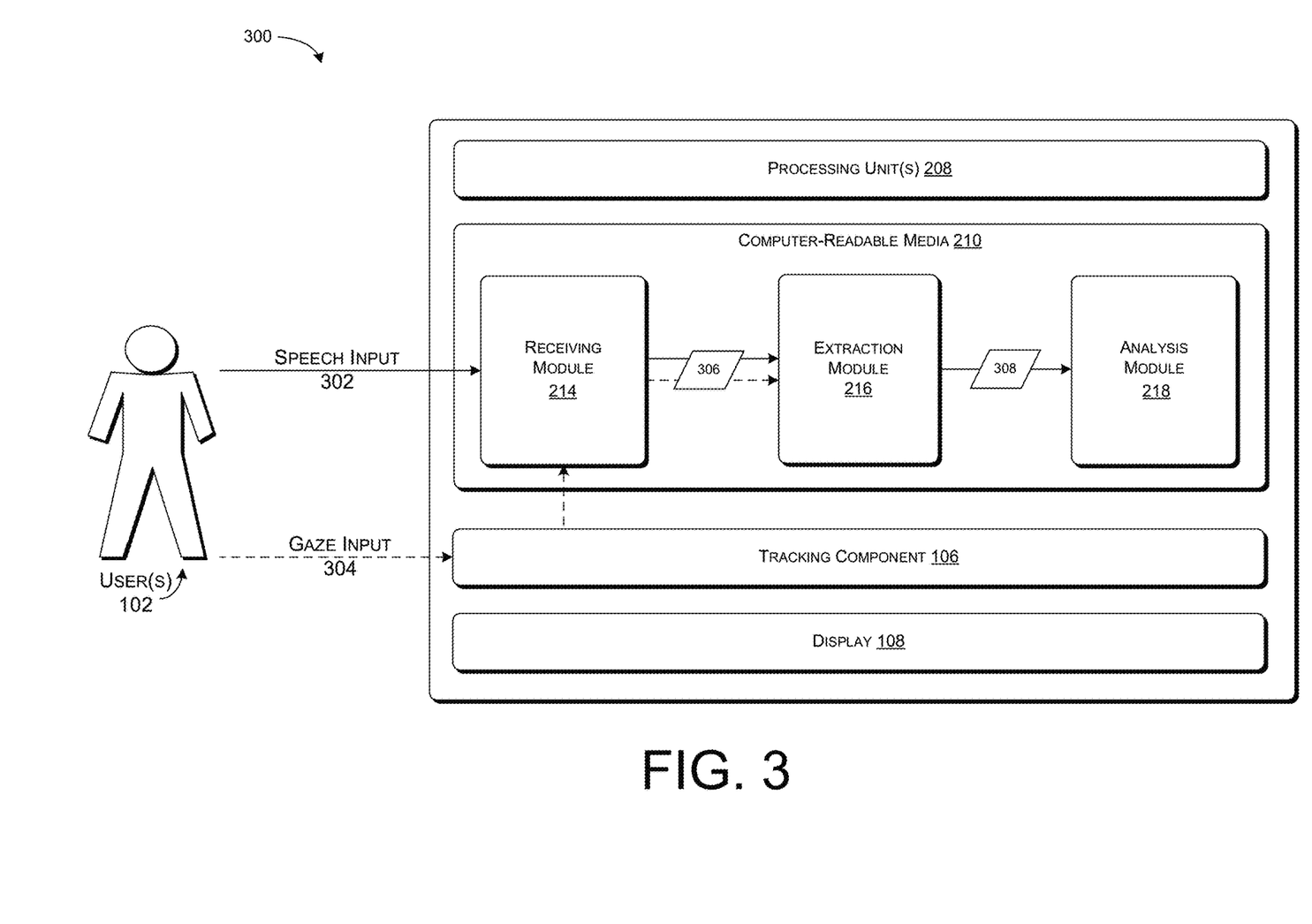
FIG. 3 illustrates an example operating environment that can be implemented for resolving references to visual elements in a visual context associated with a computerized conversational system.

FIG. 3 illustrates an example operating environment 300 that can be implemented for resolving references to visual elements in a visual context. In at least one example, operating environment 300 can enable users to perform common tasks, such as buying plane tickets, finding a restaurant, shopping online, etc. in a free-form web-browsing visual context, application interface, etc. As described below, example operating environment 300 leverages the receiving module 214, extraction module 216, and analysis module 218 to improve the accuracy in which spoken language understanding can be used to identify visual elements in a visual context associated with a computerized conversational system. The display module 212 is not shown in FIG. 3.

As described above, the receiving module 214 can be configured to receive input from the one or more user(s) 102 such as spoken speech input 302 (e.g., speech input 110), gestures, gaze input 304 (e.g., gaze input 112), body positioning, etc. The receiving module 214 can receive the speech input 302 via a microphone or some other device associated with the user device 104 that is configured for receiving speech input 302. In at least one example, the speech input 302 can include a reference to a visual element on a display 108 of the user device 104. The reference can explicitly identify (e.g., directly refer to) items on web pages or the reference can implicitly identify (e.g., indirectly refer to) items on web pages. For instance, the speech input 302 can directly refer to a link, item, movie, etc., by including the full or partial text of a link, item, movie, etc., in the speech input 302. In other examples, the speech input 302 can include an implicit reference such as "show me the red shoes," "I want to buy that one," or "the top flight looks good." The speech input 302 can be free from constraints on vocabulary, grammar, and/or choice of intent that can make up the speech input. The receiving module 214 can be configured to generate a user utterance by transcribing the speech input 302. The user utterance can be sent to the extraction module 216 for processing.

Additionally, the receiving module 214 can receive gaze input 304 via the tracking component 106. In at least one example, the tracking component 106 tracks the user's 102 eye gaze fixations. In some examples, the tracking component 106 can track the user's 102 head pose and/or a direction a user's nose points as a proxy for gaze fixations, as described above. The tracking component 106 can provide gaze input 304 to the receiving module 214.

The receiving module 214 can output the input data 306 to the extraction module 216. The input data 306 can include speech input 302 that is transcribed into user utterances, gaze input 304, and/or other forms of user 102 input. The extraction module 216 can be configured to extract features based at least in part on the input data 306. The extraction module 216 can extract lexical features, gaze features, heat map features, etc.

The extraction module 216 can extract one or more lexical features. Lexical similarity describes a process for using words and associated semantics to determine a similarity between words in two or more word sets. Lexical features can determine lexical similarities between words that make up the text associated with one or more visual elements in a visual context and words in the speech input 302. The extraction module 216 can leverage automatic speech recognition ("ASR") models and/or general language models to compute the lexical features. The extraction module 216 can leverage various models and/or techniques depending on the visual context of the visual items. For instance, if the visual context includes a web browser, the extraction module 216 can leverage a parser to parse links associated with visual elements on the display 108.

Non-limiting examples of lexical features include a cosine similarity between term vectors of the text associated with the one or more visual elements in the visual context and the speech input 302, a number of characters in the longest common subsequence of the text associated with the one or more visual elements in the visual context and the speech input 302, and/or a binary feature that indicates whether a the text associated with the one or more visual elements in the visual context was included in the speech input 302, and if so, the length of the text associated with the one or more visual elements in the visual context. The lexical features can be computed at phrase, word, and/or character levels.

The extraction module 216 can also extract one or more gaze features. Gaze features can represent distances between visual elements and fixation points of gaze input 304 at various times. Gaze features can be time based gaze features and/or distance based gaze features. Distance based and time based features can be used together.

To determine the gaze features, the extraction module 216 can identify text and/or a picture associated with a link (e.g., in a web-browser visual context) and/or an item (e.g., in a conversational system visual context) and calculate a distance around or area associated with the text and/or image. The calculated distance or area associated with the text and/or image can represent a bounding box and can be used for gaze feature extraction. The gaze features can consider a size of the bounding box and/or a frequency representing how often a user's 102 gaze fixes on or near the bounding box.

The extraction module 216 can identify fixation points representing where a user's 102 gaze lands in a visual context. The extraction module 216 can leverage a model to identify individual fixation points from the gaze input data 306. In at least one example, the extraction module 216 can leverage models such as velocity-threshold identification algorithms, hidden Markov model fixation identification algorithms, dispersion-threshold identification algorithms, minimum spanning trees identification algorithms, area-of-interest identification algorithms, and/or velocity-based, dispersion-based, and/or area-based algorithms to identify the fixation points from the gaze input data 306. Fixation points can be grouped into clusters and the clusters can be used to identify individual gaze locations. A cluster can be defined by two or more individual fixation points located within a predetermined distance (e.g., less than 40 pixels, etc.). The centroid of a cluster of fixation points can be used for extracting gaze features described below.

Gaze features can represent distances between a bounding box and a centroid fixation point of one or more clusters of fixation points at various times, as described above. Non-limiting examples of gaze features can include one or more of: a distance from a centroid fixation point to the bounding box at a start of the speech input 302;
- a distance from a centroid fixation point to the bounding box at an end of the speech input 302;
- a distance from a centroid fixation point to the bounding box during the time between a start of the speech input 302 and an end of the speech input 302;
- a distance from a centroid fixation point to the bounding box during a predetermined window of time (e.g., 1 second, 2 second, etc.) before the speech input 302 begins;
- whether the bounding box was within a predetermined radius (e.g., 1 cm, 3 cm, etc.) of a centroid fixation point at predetermined time intervals (e.g., 1 second, 2 seconds, 3 seconds, etc.) before the speech input 302 begins;
- whether the bounding box was within a predetermined radius (e.g., 1 cm, 3 cm, etc.) of a centroid fixation point at the time the speech input 302 was received;
- a size of the bounding box;
- how frequently the user 102 looked at the bounding box during the speech input 302;
- a total length of time the user 102 looked at the bounding box during the speech input 302;
- how frequently the bounding box was within a predetermined radius (e.g., 1 cm, 3 cm, etc.) of a centroid fixation point during the speech input 302; and/or
- a total length of time the bounding box was within a predetermined radius (e.g., 1 cm, 3 cm, etc.) of a centroid fixation point during the speech input 302.

The extraction module 216 can also extract one or more heat map features. A heat map can represent a probabilistic model of what a user 102 may be looking at in a visual context. The heat map can be calculated from gaze input 112 (e.g., eye gaze, head pose, etc.). In at least one example, the extraction module 216 can leverage a two-dimensional Gaussian model on individual fixation points to model probabilities that a user 102 has seen any particular visual element that is presented in a visual context. The individual fixation points can be determined from the gaze input 112 (e.g., eye gaze, head pose, etc.), as described above. In some examples, the Gaussian model can use a radius of a predetermined length. The Gaussian model can model how gaze fixations change over time and determine a probability used to indicate a likelihood that a user 102 may look at particular visual elements in the visual context. In at least one example, a heat map determined based on eye gaze input 112 can be more representative of what the user 102 may be looking at than a heat map determined based on head pose or nose pointing gaze input 112.

The extraction module 216 may leverage the heat map to extract heat map features. Heat map features can include one or more features that connect fixation points and visual elements in the visual context. As described above, the extracting module 216 can calculate a distance around or area associated with each visual element (e.g., text, picture, etc.) that can be presented on a display 108 associated with a visual context. The calculated distance or area associated with the visual element can represent a bounding box and can be used for heat map feature extraction. In at least one example, heat map features can be based at least in part on heat map probabilities associated with the area inside a bounding box. The heat map probabilities associated with the area inside the bounding box may be used to calculate a likelihood that a user 102 has seen the visual element corresponding to the boundary box on the display 108. In some examples, heat map features may include one or more features that capture gaze fixations over windows of predetermined time.

The extraction module 216 can output a set of features 308 based at least in part on the speech input 302, gaze input 304, and the visual elements in the visual context. The set of features 308 can include lexical features, eye gaze features, and/or heat map features.

The analysis module 218 can be configured to resolve references to visual elements in a visual context based at least in part on the extracted features. In at least one example, the analysis module 218 can leverage a classification system to compute probabilities associated with individual visual elements and determine which visual element was the subject of the speech input 302 based at least in part on the computed probabilities. In some examples, the analysis module 218 can identify the visual element that was the subject of the speech input based at least in part on identifying a visual element having a highest probability. In other examples, the analysis module 218 can leverage the classification system to identify visual elements in the visual context that have a calculated probability over a predetermined threshold. The analysis module 218 can identify the visual element that was the subject of the speech input 302 as one of the visual elements having a calculated probability over a predetermined threshold.

In some examples, the analysis module 218 can consider combinations of two or more features (e.g., lexical features, gaze features, heat map features, etc.) in classifying the visual elements. In at least one example, the analysis module 218 can leverage a classifier configured to determine whether a particular visual element was the intended subject of a speech input 302 based at least in part on the set of features 308 extracted by the extraction module 216. In at least one example, the classifier can include an icsiboost classifier, AdaBoost classifier, sleeping-experts classifier, Naïve-Bayes classifier, Rocchio classifier, RIPPER classifier, etc. In some examples, the classifier can represent a binary classifier. The analysis module 218 can output a probability of intended referral (e.g., P(item was referred|item, f_lexical, f_gaze), where f_lexical refers to lexical features and f_gaze refers to gaze features) that represents a measure of likelihood that a particular visual element was the subject of the speech input 302. Other classifiers can be used by the analysis module 218 for resolving references to visual elements in a visual context.

In at least one example, the analysis module 218 can receive a set of features 308 for processing via a classifier, as shown in FIG. 3. In some examples, the set of features may include a probability that a particular visual element is the visual element referred to in the speech input 302 based at least in part on the lexical features and a probability that a particular visual element is the visual element based at least in part on the gaze features. The classifier can multiply the two probabilities together to calculate a new probability that can be used to determine whether a particular visual element was the particular visual element the user 102 intended to interact with in the visual context. In other examples, the analysis module 218 can classify each of the features (e.g., lexical features, gaze features, heat map features) separately and then combine the output of the classification to resolve references to visual elements in a visual context. Alternatively, the analysis module 218 can apply a first classifier to a set of lexical features extracted from the user utterance 110 and if the user utterance is vague and/or ambiguous, apply a second classifier to a set of gaze features extracted from gaze input 112.

The analysis module 218 can include a filtering module to identify one or more visual elements with the highest probabilities and/or one or more visual elements with probabilities determined to be above a predetermined threshold. In some examples, the analysis module 218 can additionally or alternatively include a ranking module for ranking the visual elements based at least in part on the probabilities determined by the analysis module 218. The analysis module 218 can leverage the results of the ranking module to resolve references to visual elements in a visual context. In some examples, a visual element with the highest probability can be ranked at the top of a list of visual elements and the analysis module 218 can determine that the top ranked visual element is the intended target of the user utterance.

Figure 4:
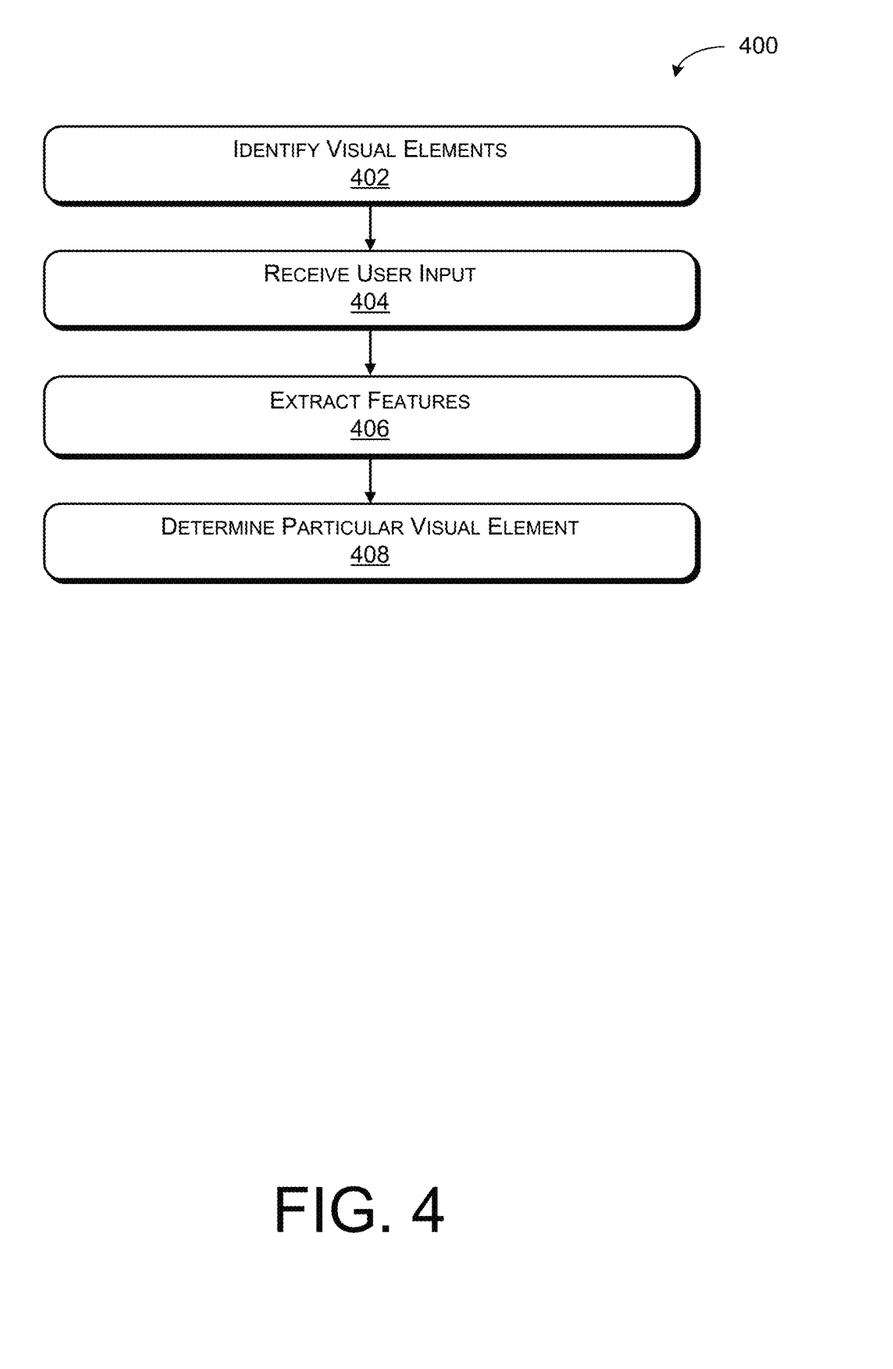
FIG. 4 illustrates an example process for resolving references to visual elements in a visual context associated with a computerized conversational system.

FIG. 4 illustrates an example process 400 for determining an intended visual element of the one or more visual elements in a visual context associated with a computerized conversational system.

Block 402 illustrates identifying visual elements that are available for receiving user interaction in a visual context. As described above, the visual context can include a web browser, conversational interaction system, or some other visual context for displaying visual elements. Individual visual elements can be associated with actions and/or tasks that can be performed by the computerized conversational system. The extraction module 216 can identify visual elements and, as described above, can determine a distance and/or area around the visual elements (e.g., the bounding box).

Block 404 illustrates receiving user input associated with one or more of the visual elements in the visual context. The receiving module 214 can receive user input such as speech input 302 that can be transcribed into a user utterance, gaze input 304 (e.g., eye gaze, head pose, etc.), gesture input, etc. In at least one example, the speech input 302 can refer to a particular visual element of the one or more visual elements in the visual context. As described above, the speech input 302 can explicitly refer to a particular visual element and/or implicitly refer to a particular visual element. The speech input 302 can be free from constraints on vocabulary, grammar, and/or choice of intent that can make up the speech input 302. In addition to the speech input 302, the receiving module 214 can receive gaze input 304. In at least one example, the gaze input 304 can be collected by the tracking component 106 tracking user gaze, head pose, etc., while the user 102 interacts with the computerized computing system.

Block 406 illustrates extracting lexical features and gaze features based at least in part on the visual elements and the user input. The extraction module 216 can extract lexical features, gaze features, and heat map features, as described above. Extracting gaze features can include computing distances between the defined areas determined for the individual visual elements (e.g., bounding box) and fixation points (e.g., centroid fixation point and/or any fixation point) associated with the gaze input 304 at predetermined times. Extracting lexical features can include computing a lexical similarity between text associated with individual visual elements of the visual elements in the visual context and the speech input 302, as described above. Extracting heat map features can include extracting one or more features that connect gaze input 304 fixations and visual elements presented on the display 108

Block 408 illustrates determining a particular visual element of the one or more visual elements associated with the user input. The analysis module 218 can determine the visual element that was the intended subject of the speech input 302 based at least in part on the lexical features and gaze features. Determining the intended visual element can include classifying the visual elements via a binary classifier, as described above. The analysis module 218 can leverage the classifier for calculating probabilities associated with the visual elements. As described above, the analysis module 218 can further filter and/or rank the visual elements based at least in part on the calculated probabilities. The analysis module 218 can determine the particular visual element based at least on the calculated probabilities. In at least some examples, the particular visual element can be associated with an action and/or task and, based at least in part on identifying the particular visual element, the analysis module 218 can cause the action and/or task associated with the particular visual element to be performed in the visual context.

Figure 5:
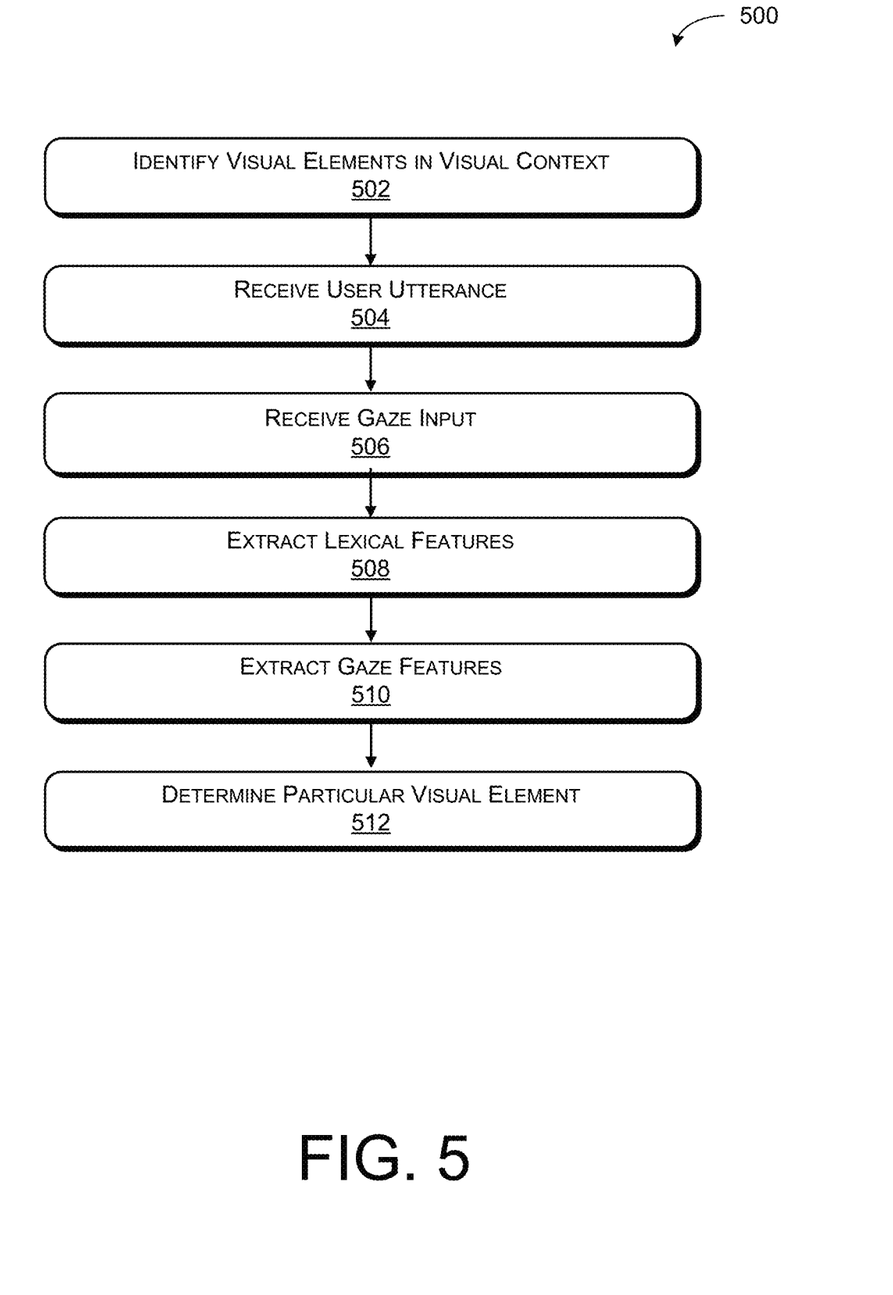
FIG. 5 illustrates an example process for determining a particular visual element that is referred to in a user utterance based at least in part on the lexical features and gaze features.

FIG. 5 illustrates an example process 500 for determining a particular visual element that is referred to in a user utterance based at least in part on the lexical features and gaze features.

Block 502 illustrates identifying visual elements for receiving user interaction in a visual context. As described above, the visual context can include a web browser, application interface, or some other visual context for displaying visual elements. The extraction module 216 can identify visual elements in the visual context and, as described above, can determine a distance and/or area around the visual elements (e.g., bounding box).

Block 504 illustrates receiving a user utterance referring to a first visual element of the one or more visual elements in the visual context. The receiving module 214 can receive user input such as speech input 302 and may transcribe the speech input 302 into a user utterance for processing by the extraction module 216. In at least one example, the user utterance can refer to a particular visual element of the one or more visual elements in the visual context. As described above, the user utterance can explicitly refer to a particular visual element and/or implicitly refer to a particular visual element. The user utterance can be free from constraints on vocabulary, grammar, and/or choice of intent that can make up the user utterance.

Block 506 illustrates receiving gaze input 304 associated with at least a second visual element of the one or more visual elements in the visual context. The receiving module 214 can receive user input, such as gaze input 304 (e.g., eye gaze, head pose, etc.). In at least one example, the gaze input 304 can be collected by the tracking component 106, as described above.

Block 508 illustrates extracting lexical features based at least in part on the user utterance and the visual elements. The extraction module 216 can extract lexical features. Extracting lexical features can include computing a lexical similarity between text associated with individual visual elements of the visual elements in the visual context and the user utterance, as described above.

Block 510 illustrates extracting gaze features based at least in part on the gaze input 304 and the visual elements. The extraction module 216 can extract gaze features. As described above, extracting gaze features can include computing distances between the bounding boxes associated with the individual visual elements and fixation points associated with the gaze input 304 at predetermined times.

Block 512 illustrates determining a particular visual element of the visual elements that is referred to in the user utterance. As described above, the determining can be based at least in part on the lexical features and gaze features. In some examples, the determining can be based on heat map features in addition to the lexical features and gaze features. The analysis module 218 can leverage the classifier for calculating probabilities associated with the visual elements. As described above, the analysis module 218 can further filter and/or rank the visual elements based at least in part on the calculated probabilities. The analysis module 218 can determine the intended visual element based at least on the calculated probabilities. In at least some examples, the intended visual element can be associated with an action and/or task and, based at least in part on identifying the intended visual element, the analysis module 218 can cause the computerized conversational system to perform the action and/or task associated with the intended visual element.

Figure 6:
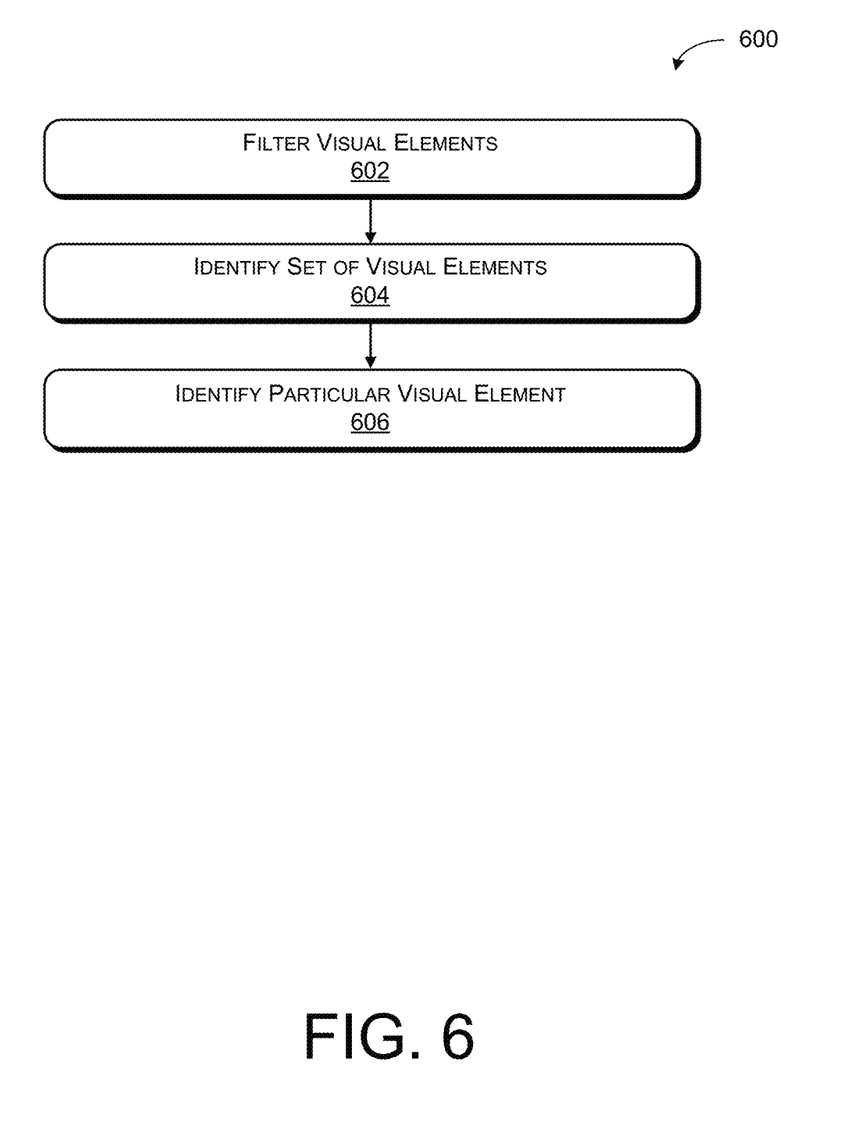
FIG. 6 illustrates a process for filtering and identifying an intended visual element in a visual context associated with a computerized conversational system.

FIG. 6 illustrates a process 600 for filtering and identifying a particular visual element in a visual context.

Block 602 illustrates filtering the visual elements based at least in part on the calculated probabilities. As described above, the analysis module 218 can leverage a classifier configured to determine whether a particular visual element can be the subject of a user utterance 110 based at least in part on the set of features 308 extracted by the extraction module 216. The analysis module 218 can output a probability of intended referral (e.g., P(item was referred|item, f_lexical, f_gaze), where f_lexical refers to lexical features and f_gaze refers to gaze features), as described above. The analysis module 218 can include a filtering module to filter the visual elements based at least in part on probabilities. In some examples, the analysis module 218 can additionally or alternatively include a ranking module for ranking the visual elements based at least in part on the probabilities determined by the analysis module 218.

Block 604 illustrates identifying a set of visual elements based at least in part on individual visual elements in the set of visual elements having probabilities above a predetermined threshold. In at least one example, the analysis module 218 can identify a set of visual elements with probabilities determined to be above a predetermined threshold, as described above.

Block 606 illustrates identifying the particular visual element from the set of visual elements. The analysis module 218 can identify the particular visual element from the set of visual elements with probabilities determined to be above a predetermined threshold. In some examples, the particular visual element can be the visual element with a highest probability, or a probability above a predetermined threshold.

A. A computer-implemented method comprising: identifying visual elements available for user interaction in a visual context; receiving user input associated with one or more of the visual elements in the visual context, the user input comprising: an utterance derived from speech input referring to a particular visual element of the one or more visual elements; and a gaze input associated with at least some of the one or more visual elements, the at least some of the one or more visual elements including the particular visual element; extracting lexical features and gaze features based at least in part on the visual elements and the user input; and determining the particular visual element based at least in part on the lexical features and gaze features.

B. A computer-implemented method as paragraph A recites, wherein the visual context is a free-form web browser or an application interface.

C. A computer-implemented method as any of paragraphs A or B recite, wherein the gaze input comprises eye gaze input associated with at least the intended visual element or head pose input associated with at least the intended element, wherein the user head pose input serves as a proxy for eye gaze input.

D. A computer-implemented method as any of paragraphs A-C recite, further comprising calculating probabilities associated with individual visual elements of the visual elements to determine the particular visual element, the probabilities based at least in part on the lexical features and the gaze features.

E. A computer-implemented method as any of paragraphs A-D recite, further comprising: filtering the individual visual elements based at least in part on calculated probabilities; identifying a set of visual elements based at least in part on the individual visual elements in the set of visual elements having probabilities above a predetermined threshold; and identifying the particular visual element from the set of visual elements.

F. A computer-implemented method any of paragraphs A-E recite, wherein extracting gaze features comprises: identifying a plurality of fixation points associated with the gaze input; grouping a predetermined number of the plurality of fixation points together in a cluster; and identify a centroid of the cluster as a specific fixation point for extracting the gaze features.

G. A computer-implemented method as any of claims A-F recite, wherein extracting the gaze features comprises: computing a start time and an end time of the speech input; and extracting the gaze features based at least in part on: distances between a specific fixation point and an area associated with individual visual elements of the visual elements; the start time of the speech input; and the end time of the speech input.

H. A computer-implemented method as any of claims A-G recite, wherein the particular visual element is associated with an action and the method further comprises, based at least in part on identifying the particular visual element, causing the action associated with the intended visual element to be performed in the visual context.

I. One or more computer-readable media encoded with instructions that, when executed by a processor, configure a computer to perform a method as any of paragraphs A-H recites.

J. A device comprising one or more processors and one or more computer readable media encoded with instructions that, when executed by the one or more processors, configure a computer to perform a computer-implemented method as recited in any one of paragraphs A-H.

K. A system comprising: means for identifying visual elements available for user interaction in a visual context; means for receiving user input associated with one or more of the visual elements in the visual context, the user input comprising: an utterance derived from speech input referring to a particular visual element of the one or more visual elements; and a gaze input associated with at least some of the one or more visual elements, the at least some of the one or more visual elements including the particular visual element; means for extracting lexical features and gaze features based at least in part on the visual elements and the user input; and means for determining the particular visual element based at least in part on the lexical features and gaze features.

L. A system as paragraph K recites, wherein the visual context is a free-form web browser or an application interface.

M. A system as any of paragraphs K or L recites, wherein the gaze input comprises eye gaze input associated with at least the intended visual element or head pose input associated with at least the intended element, wherein the user head pose input serves as a proxy for eye gaze input.

N. A system as any of paragraphs K-M recite, further comprising means for calculating probabilities associated with individual visual elements of the visual elements to determine the particular visual element, the probabilities based at least in part on the lexical features and the gaze features.

O. A system as any of paragraphs K-N recite, further comprising means for filtering the individual visual elements based at least in part on calculated probabilities; means for identifying a set of visual elements based at least in part on the individual visual elements in the set of visual elements having probabilities above a predetermined threshold; and means for identifying the particular visual element from the set of visual elements.

P. A system as any of paragraphs K-O recite, wherein extracting gaze features comprises: identifying a plurality of fixation points associated with the gaze input; grouping a predetermined number of the plurality of fixation points together in a cluster; and identify a centroid of the cluster as a specific fixation point for extracting the gaze features.

Q. A system as any of paragraphs K-P recite, wherein extracting the gaze features comprises: computing a start time and an end time of the speech input; and extracting the gaze features based at least in part on: distances between a specific fixation point and an area associated with individual visual elements of the visual elements; the start time of the speech input; and the end time of the speech input.

R. A system as any of paragraphs K-Q recite, wherein the particular visual element is associated with an action and the method further comprises means for, based at least in part on identifying the particular visual element, causing the action associated with the intended visual element to be performed in the visual context.

S. One or more computer-readable media encoded with instructions that, when executed by a processor, configure a computer to perform acts comprising: identifying visual elements for receiving user interaction in a visual context; receiving a user utterance transcribed from speech input referring to a first visual element of the visual elements in the visual context; receiving gaze input associated with at least a second visual element of the visual elements in the visual context; extracting lexical features based at least in part on the user utterance and the visual elements; extracting gaze features based at least in part on the gaze input and the visual elements; and determining the first visual element based at least in part on the lexical features and gaze features.

T. One or more computer-readable media as paragraph S recites, wherein the acts further comprise extracting heat map features based at least in part on the gaze input and the visual elements.

U. One or more computer-readable media any of paragraphs S or T recite, wherein the acts further comprise determining a bounding box for individual visual elements of the visual elements, the bounding box comprising an area associated with the individual visual elements.

V. One or more computer-readable media as any of paragraphs S-U recite, wherein extracting gaze features comprises computing distances between bounding boxes for individual visual elements and fixation points associated with the gaze input at predetermined times, the bounding boxes comprising areas associated with the individual visual elements.

W. One or more computer-readable media as any of paragraphs S-V recite, wherein extracting lexical features comprises computing a lexical similarity between text associated with individual visual elements of the visual elements and the user utterance.

X. One or more computer-readable media as any of paragraphs S-W recite, wherein determining the particular visual element comprises classifying the visual elements based at least in part on applying a binary classifier to at least one of the lexical features and gaze features.

Y. A device comprising one or more processors and one or more computer readable media as recited in any of paragraphs S-X.

Z. A system comprising: computer-readable media; one or more processors; and one or more modules on the computer-readable media and executable by the one or more processors, the one or more modules including: a receiving module configured to receive: a user utterance transcribed from speech input referring to a particular visual element of a plurality of visual elements presented on a user interface associated with a visual context; and gaze input directed to one or more of the plurality of visual elements presented on the user interface associated with the visual context; an extraction module configured to extract a set of features based at least in part on the plurality of visual elements, the user utterance, and the gaze input; and an analysis module configured to identify the particular visual element based at least in part on the set of features.

AA. A system as paragraph Z recites, further comprising a display module configured to display the plurality of visual elements on the user interface.

AB. A system as any of paragraphs Z or AA recite, wherein the set of features includes at least: lexical features, wherein lexical features represent lexical similarity between text associated with individual visual elements of the plurality of visual elements and the user utterance; and gaze features, wherein gaze features represent distances between bounding boxes associated with the individual visual elements and fixation points associated with the gaze input at predetermined times.

AC. A system as any of paragraphs Z-AB recite, wherein the extraction module is further configured to extract heat map features based at least in part on the gaze input and the plurality of visual elements.

AD. A system as any of paragraphs Z-AC recite, wherein the analysis module is further configured to calculate probabilities associated with individual visual elements of the plurality of visual elements to identify the particular visual element, the probabilities based at least in part on lexical features and gaze features.

AE. A system as paragraph AD recites, wherein the analysis module is further configured to identify the particular visual element based at least in part on the particular element having a highest probability of all of the calculated probabilities associated with the plurality of visual elements.

AF. A system as paragraph AD recites, wherein the analysis module is further configured to: classify the lexical features in a first process; classify the gaze features in a second process, the second process at a time different from the first process; and based at least in part on classifying the lexical features and classifying the gaze features: calculate probabilities associated with individual visual elements of the plurality of visual elements to identify the particular visual element; and identify the particular visual element based at least in part on the calculated probabilities.

Conclusion

In closing, although the various examples have been described in language specific to structural features and/or methodical acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method comprising:
   receiving a user utterance of a user derived from speech input referring to a visual element of multiple visual elements in a visual context for displaying the multiple visual elements;
   receiving, from a tracking device, a gaze input with respect to the user;
   identifying, for each visual element of the multiple visual elements in the visual context, ter associated with the visual element;
   computing, for each visual element of the multiple visual elements independent of the gaze input, a lexical similarity between the text associated with the visual element and the user utterance and, for each lexical similarity, a lexical probability corresponding to the referred visual element;
   extracting a gaze feature using the gaze input and the multiple visual elements;
   determining that a particular visual element of the multiple visual elements is the referred visual element in the user utterance, using a lexical probability of the computed lexical probabilities together with a computed probability that the particular visual element is the referred visual element in the speech input using the gaze feature; and
   causing an action associated with the particular visual element to be performed.

2. The computer-implemented method of claim 1, wherein using the lexical probability of the computed lexical probabilities together with the computed probability using the gaze feature includes generating a probability that the particular visual element is the referred visual element in the speech input given the gaze feature and given one or more of a cosine similarity between term vectors of the text associated with the particular visual element and the speech input and a number of characters in a longest common subsequence of the particular visual element and the speech input.

3. The computer-implemented method of claim 1, comprising:
   filtering each visual element of the multiple visual elements using the computed lexical probabilities together with the computed probability using the gaze feature;
   identifying a set of visual elements of the multiple visual elements having probabilities above a predetermined threshold; and
   identifying the particular visual element from the set of visual elements.

4. The computer-implemented method of claim 3, wherein filtering each visual element of the multiple visual elements includes ranking the visual elements using, for each visual element, a probability that the respective visual element is the referred visual element given the gaze feature and the computed lexical similarity for the respective visual element.

5. The computer-implemented method of claim 1, wherein the method includes multiplying the lexical probability and the computed probability using the gaze feature together to form a new probability that the particular visual element is the referred visual element in the speech input.

6. The computer-implemented method of claim 1, comprising:
   identifying a plurality of fixation points associated with the gaze input;
   grouping a predetermined number of the plurality of fixation points together in a cluster; and
   identifying a centroid of the cluster as a specific fixation point for extracting the gaze feature from the gaze input.

7. The computer-implemented method of claim 6, comprising:
   computing a start time and an end time of the speech input; and
   extracting the gaze feature based at least in part on:
      distances between the specific fixation point and an area associated with individual visual elements of the multiple visual elements;
      the start time of the speech input; and
      the end time of the speech input.

8. A device comprising:
   one or more processors;
   computer-readable media encoded with instructions that, when executed by the one or more processors, cause the device to perform operations comprising:
      receiving a user utterance of a user derived from speech input referring to a visual element of multiple visual elements in a visual context for displaying the multiple visual elements;
      receiving, from a tracking device, a gaze input with respect to the user;
      identifying, for each visual element of the multiple visual elements in the visual context, text associated with the visual element;
      computing, for each visual element of the multiple visual elements independent of the gaze input; a lexical similarity between the text associated with the visual element and the user utterance and, for each lexical similarity, a lexical probability corresponding to the referred visual element;
      extracting a gaze feature using the gaze input and the multiple visual elements;
      determining that a particular visual element of the multiple visual elements is the referred visual element in the user utterance, using a lexical probability of the computed lexical probabilities together with a computed probability that the particular visual element is the referred visual element in the speech input using the gaze feature; and
      causing an action associated with the particular visual element to be performed.

9. The device of claim 8, wherein the operations comprise:

determining a bounding box for each visual element of the multiple visual elements, the bounding box comprising an area associated with the respective visual element; and computing, in the extracting of the gaze feature, distances between bounding boxes for the visual elements and fixation points associated with the gaze input at predetermined times.

10. The device of claim 8, wherein the gaze feature comprises one or more of how frequently the user looked at a bounding box during the speech input with the bounding box comprising an area associated with an individual visual element; a total length of time the user looked at the bounding box during the speech input; how frequently the bounding box was within a predetermined radius of a centroid fixation point during the speech input; and a total length of time the bounding box was within a predetermined radius of a centroid fixation point during the speech input.

11. The device of claim 8, wherein the operations include multiplying the lexical probability and the computed probability using the gaze feature together to form a new probability that the particular visual element is the referred visual element in the speech input.

12. The device of claim 8, wherein the visual context is a free-form web browser or an application interface.

13. The device of claim 8, wherein the action is caused to be performed in the visual context.

14. A device comprising:
one or more processors;
computer-readable media encoded with instructions that, when executed by the one or more processors, cause the device to perform operations comprising:
identifying visual elements in a visual context for displaying the visual elements;
receiving a user utterance of a user derived from speech input referring to a visual element of the visual elements in the visual context;
receiving a gaze input with respect to the user and the visual elements;
extracting a lexical feature based at least in part on computing lexical similarities between the user utterance and text associated with individual visual elements of the visual elements in the visual context;
extracting a gaze feature using the gaze input and the visual elements;
determining that a particular visual element of the visual elements is the referred visual element in the user utterance, using at least in part a computation based on the gaze feature and the lexical feature; and
causing an action associated with the particular visual element to be performed, wherein determining that the particular visual element of the visual elements is the referred visual element in the user utterance comprises applying a binary classifier to at least one of the lexical feature or the gaze feature to classify the individual visual elements.

15. A system comprising:
a tracking sensor;
a display;
one or more processors; and
computer-readable media encoded with instructions that, when executed by the one or more processors, cause the device to perform operations comprising:
receiving a user utterance of a user derived from speech input referring to a visual element of multiple visual elements on a user interface of the display;
receiving a gaze input of a user from the tracking sensor with respect to the user;
identifying, for each visual element of the multiple visual elements in the visual context, text associated with the visual element;
computing, for each visual element of the multiple visual elements independent of the gaze input, a lexical similarity between the text associated with the visual element and the user utterance and, for each lexical similarity, a lexical probability corresponding to the referred visual element;
extracting a gaze feature using the gaze input and the multiple visual elements;
determining that a particular visual element of the multiple visual elements is the referred Moil visual element in the user utterance, using a lexical probability of the computed lexical probabilities together with a computed probability that the particular visual element is the referred visual element in the speech input using the gaze feature.

16. The system of claim 15, wherein determining that the particular visual element of the multiple visual elements is the referred visual element in the user utterance comprises using a combination of a lexical probability and a gaze probability for each visual element.

17. The system of claim 15, wherein the gaze feature is a time based gaze feature, distance based gaze feature, or a combination of time based gaze feature and distance based gaze feature.

18. The system of claim 15, wherein the operations comprise:
using a model to identify individual fixation points from the gaze input.

19. The system of claim 15, wherein the instructions to perform the operations comprise the instructions distributed into modules including at least a display module, a receiving module, an extraction module, and an analysis module.

20. A system comprising:
a tracking sensor;
a display;
one or more processors; and
computer-readable media encoded with instructions that, when executed by the one or more processors, cause the device to perform operations comprising:
identifying visual elements presented on a user interface of the display;
receiving a user utterance of a user derived from speech input referring to a visual element of the visual elements;
receiving a gaze input of a user from the tracking sensor with respect to the user and the visual elements;
extracting a lexical feature based at least in part on computing lexical similarities between the user utterance and text associated with individual visual elements of the visual elements in the visual context;
extracting a gaze feature using the gaze input and the visual elements;
determining that a particular visual element of the visual elements is the referred visual element in the user utterance, using at least in part a computation based on the gaze feature and the lexical feature from computing lexical similarities, wherein determining that the particular visual element of the visual elements is the referred visual element in the user utterance comprises using a combination of a lexical probability and a gaze probability for each individual visual element in which the combination includes a multiplication of the lexical probability and the gaze probability for each individual visual element.

\* \* \* \* \*